(No Model.) 2 Sheets—Sheet 1.

H. MACKENSTEIN.
REGISTERING AND MARKING APPARATUS FOR PHOTOGRAPHIC FILM HOLDERS.

No. 518,372. Patented Apr. 17, 1894.

Witnesses:
C. Sundgren
George Barry

Inventor:
Hermann Mackenstein
by attorneys
Brown & Seward (No Model.) 2 Sheets—Sheet 2.
H. MACKENSTEIN.
REGISTERING AND MARKING APPARATUS FOR PHOTOGRAPHIC FILM HOLDERS.
No. 518,372. Patented Apr. 17, 1894.
*Fig. 3.*     *Fig. 4.*     *Fig. 5.*
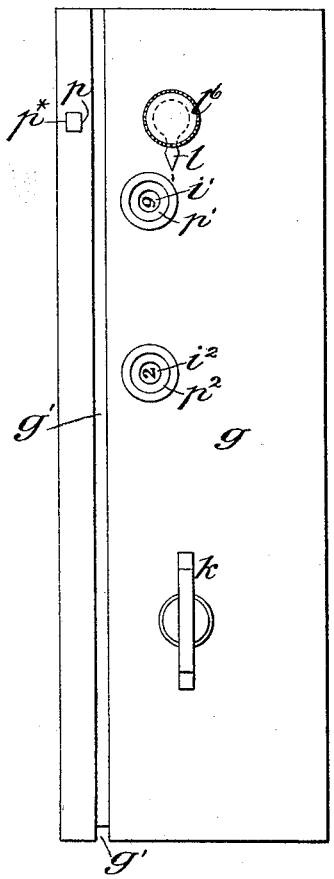 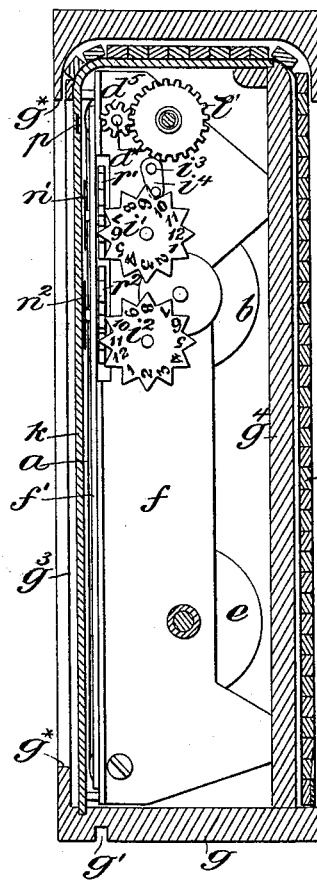 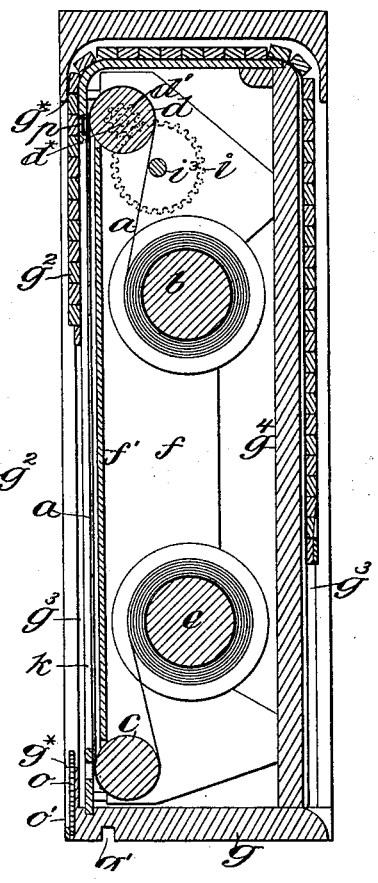
*Fig. 6.*     *Fig. 7.*
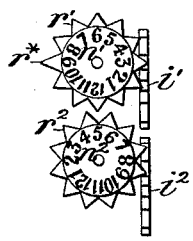 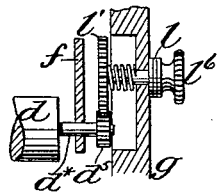
Witnesses:
C. Sundgren
George Barry.
Inventor:
Hermann Mackenstein
by attorneys
Brown & Seward
THE NATIONAL LITHOGRAPHING COMPANY,
WASHINGTON, D. C.

UNITED STATES PATENT OFFICE.

HERMANN MACKENSTEIN, OF PARIS, FRANCE.

REGISTERING AND MARKING APPARATUS FOR PHOTOGRAPHIC FILM-HOLDERS.

SPECIFICATION forming part of Letters Patent No. 518,372, dated April 17, 1894.

Application filed July 7, 1892. Serial No. 439,239. (No model.)

*To all whom it may concern:*

Be it known that I, HERMANN MACKENSTEIN, a citizen of the French Republic, residing at Paris, in said Republic, have invented a new and useful Improvement in Registering and Marking Apparatus for Photographic-Roll Holders, of which the following is a specification, reference being had to the accompanying drawings.

The object of this improvement is to provide automatically for the registering of the number of exposures of the strip of film which have been made in a photographic roll holder and the photographic numbering in regular order of the successive impressions taken upon the strip; also to provide photographically for the numbering and lettering in regular order of several strips of film which are successively placed in the roll holder and for the numbering or lettering of the impressions to identify them with the roll holder or camera in which they have been taken.

I will proceed first to describe my invention with reference to the accompanying drawings and afterward point out its novelty in claims.

Figure 1:
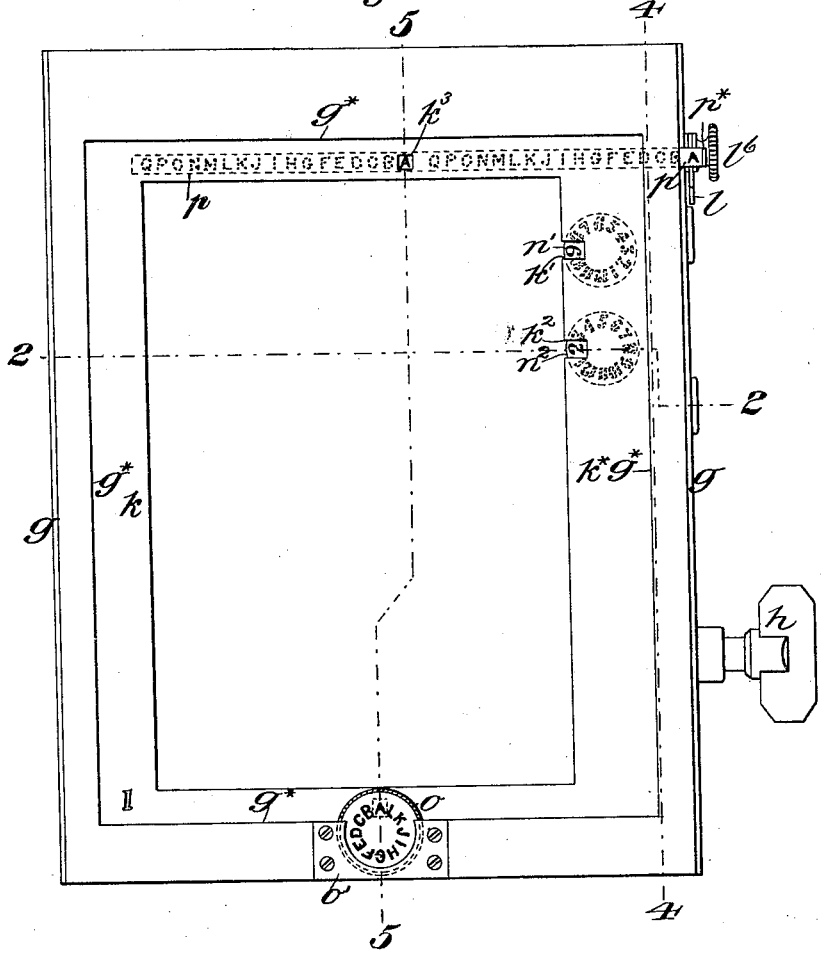
Figure 2:
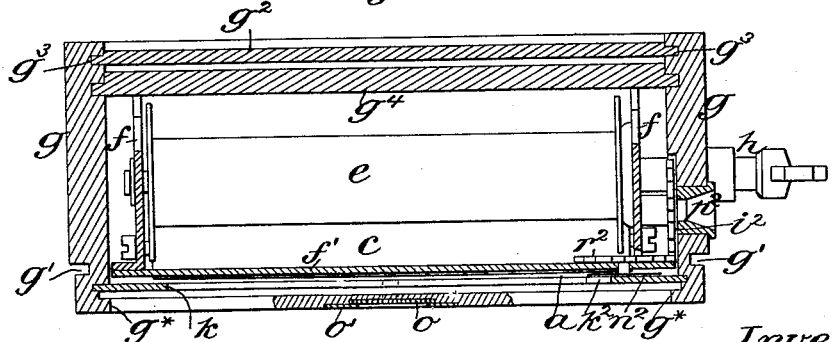

Figure 1 represents a front elevation of a photographic roll holder embodying my invention. Fig. 2 represents a horizontal section of the same in the line 2, 2 Fig. 1. Fig. 3 is an elevation of the holder taken at the side which is to the right in Fig. 1. Fig. 4 represents a vertical section parallel with the sides thereof in the line 4, 4, Fig. 1, looking to the left; Fig. 5 a vertical section parallel with Fig. 4, in the line 5. 5 Fig. 1. Figs. 6 and 7 represent detail views which will be hereinafter explained.

Similar letters of reference designate corresponding parts in all the figures.

$g$ is a box or casing having an aperture in front as indicated at $g^*$ in Figs. 1, 2, 4, and 5, and having in its sides and bottoms near the front thereof as shown in Fig. 2, a groove $g'$ to provide for its attachment to the photographic camera. This box $g$ is furnished with a sliding curtain $g^2$ which is fitted to vertical groove $g^3$ in the sides of the box for the purpose of opening and closing the aperture $g^*$. To the back $g^4$ of the box is secured the roller frame $f$ which contains the bearings for the four rollers $b\ c\ d\ e$ for carrying the sensitized strip of film $a$ (shown in Fig. 5;) $b$ being the supply roller, $e$ the take-up roller and $c$ and $d$ guide rollers, the shaft $d^*$ of the roller serving also to transmit motion to a series of dials hereinafter described for registering the number of exposures of the strip $a$ and numbering in regular order the successive impressions taken upon the strip $a$. The strip runs from the roller $b$ over the roller $d$, thence downward and under the roller $c$ to the take-up roller $e$. The roller $e$ is to be turned by a key $h$ applied to its axle through an opening in one side of the frame $f$, and this gives motion through the strip $a$ to the other rollers. Between the rollers $c$ and $d$ there is attached to the frame $f$, a flat plate $f'$ in front of which the strip runs between the said rollers. In front of this plate $f'$ there is fitted into the front of the sides of the box $g$ near the front thereof, a thin metal sash $k$, the opening of which corresponds with the aperture $g^*$ in the front of the said box. It is through the opening of this sash that the exposure of the strip takes place for the reception of the photographic impression.

$i'\ i^2$ are vertical dials which I call "registering dials" which face toward one side of the box $g$; and $n'\ n^2$ are what I call "printing dials" which face toward the front of the said box, the said dials bearing consecutive numerals commencing with 1, equally spaced in a circle thereon. The said dials are so pivoted into the frame $ff'$ and so geared together, as hereinafter described, that while the upper registering dial $i'$ presents a numeral opposite a peep-hole $p'$ in the side of the box $g$, the upper printing dial $n'$ presents a corresponding numeral opposite an opening or recess $k'$ in the inner edge of the sash $k$ for exposure to the light, and while the lower registering dial $i^2$ presents a numeral opposite a peep-hole $p^2$ in the side of the box, the lower printing dial $n^2$ presents a corresponding numeral opposite an opening or recess $k^2$ in the sash $k$ for exposure to the light. The printing dials may be made of metal in which case they will have the numerals cut out as in a stencil plate, or the said dials may be made of transparent material as mica and have the numerals printed upon them in black. The registering dials $i'\ i^2$ each have teeth in their circumference corresponding in number and position with the numerals on the dials. The printing dials $n'$ $n^2$ have secured to their pivots wheels $r'$ $r^2$ having teeth corresponding in number with the teeth of the dials, the said printing dials and the said wheels and their pivots being so arranged that a portion of each dial overlaps one edge of the film $a$ in front thereof as shown in Fig. 2 and the wheels $r'$ $r^2$ are behind the front plate $f'$ of the roller frame.

For the purpose of obtaining the rotary movements of the printing and registering dials from the shaft $d^*$ of the roller $d$, there is keyed upon the said shaft $d^*$ a pinion $d'$ which gears with a gear-wheel $i$ keyed upon a shaft $i^3$ arranged parallel with the roller $d$ in bearings in the frame $f$. On this shaft $i^3$ outside of the frame $f$, there is a small crank $i^4$ (see Fig. 4), the wrist-pin of which at each rotation engages with the teeth in the upper registering dial $i'$ and at each rotation produces the turning of one tooth of the said dial in such manner that every time a new length of the strip sufficient for a photographic impression or picture has been unrolled and presented through the opening of the sash $k$, a new numeral of the said wheel appears through the upper peep-hole $p'$ in the side of the box $g$. The teeth of the said dial $i'$ gear with the similar teeth of the wheel $r'$ belonging to the upper printing dial $n'$ in such manner that when a number of the registering dial is presented as above mentioned to the peep-hole $p'$ a corresponding number of the printing dial is presented opposite the recess or opening $k'$ in the sash as may be understood by reference to Figs. 1 and 3, for the purpose of photographically printing the exposed numeral upon the portion of the film exposed for the picture.

It is for the reason that the strip $a$ will generally be long enough for a number of exposures greater than the number of numerals that the dials $i$, and $n'$ are capable of bearing, for instance 12, as shown in the drawings, that I add the second printing dial $n^2$ and registering dial $i^2$ which turn one tooth to present a new numeral at the completion of each rotation of the first dials $i'$ and $n'$; this periodical movement is obtained by placing the wheels $r'$ $r^2$ so far from each other that they do not touch except during the passage of one of the teeth $r^3$ of the wheel $r'$ which is longer than all of the others. This will be understood by reference to Fig. 6 which represents a face view of the dials $n'$ $n^2$ and their wheels $r'$ $r^2$ and an edge view of the dials $i'$ $i^2$. With this movement the dial $n'$ will imprint upon the first twelve negatives one of the numerals 1 to 12 respectively at the same time that the dial $n^2$ will print upon all of them the additional numeral 1; the twelve following negatives will be marked 1, 2, 3 to 12 and also marked 2; and the third dozen will be marked 1, 2, 3 to 12 and also with the additional numeral 3. Thus I obtain for 144 negatives (12×12) a distinct mark consisting of a double number. In case of need it is clear that I may add one or more additional dials like $i'$ $i^2$ and $n'$ $n^2$ with corresponding wheels $r'$ $r^2$, in which case I should provide proper openings in the sash $k$ and corresponding peep-holes in the sides of the box.

The numerals may be conveniently replaced by letters or other signs upon all the dials or upon one or more of them.

In order that the operator may know exactly when he has unrolled from the roller $b$ and rolled up on the roller $e$ a length of the strip corresponding to an exposure, I place on one side of the box an indicator $l$ which makes just one rotation during the unrolling and rolling up of a proper length of strip so that the operator may cease turning the key $h$ when this indicator has arrived again at the point from which it started. The movement of this indicator $l$ is obtained by means of a toothed wheel $l'$ keyed upon its arbor and deriving motion from a pinion $d^5$ mounted on the end of the shaft $d^*$ of the roller $d$. It is desirable that the photographer may, when he wishes, give to the indicator $l$ a rotary movement independent of the wheel $l'$ in order to bring this index to its starting point marked upon the box $g$ if it should not come there after the taking out and replacing of the roller frame $f$. This may be effected by different means. This I have provided for, as shown in Fig. 7 which represents a horizontal section, of part of the box $g$ and part of the roller $d$ and frame $f$ and a top view of the indicator; the arbor of the indicator being fitted to slide in its bearing in the side of the box for the purpose of permitting the said wheel $l'$ to be brought into or out of gear with the pinion $d^5$, a helical spring being placed around said arbor between said wheel and the face of the box and serving to push and hold the said wheel into gear with the pinion $d^5$ while it permits the said wheel to be drawn out of gear by pulling the button $l^6$ on the outer end of its arbor, the wheel when so drawn out permitting the indicator to be turned by the button $l^6$.

In order to produce photographically upon each negative what I call a "series mark" to indicate the number of the strip or series in which the negative is taken, I have represented as fitted to slide in the upper part of the sash, a straight slide $p$ having inscribed upon it letters from A to Q, one of which may be always exposed to view through the opening $k^3$ in the sash as shown in Fig. 1. One end of this slide projects through one side of the box $g$ and has a lug $p^3$ by which it may be taken hold of for the purpose of manipulating it to present different letters or marks opposite the opening $k^3$. The letters or numbers upon the said slide are duplicated so that when a certain letter or number is exposed to light opposite the opening $k^3$, the corresponding duplicate is presented close to the outside of the frame so that the operator may easily see what letter or mark is at any time presented to the said opening. I have shown in the lower part of Fig. 1 and also in the section Fig. 2, a modification of this series marking device consisting of a disk o fitted within a plate o' attached to the front of the box. This disk I have represented as knurled on the edge to enable it to be turned easily. The strip p and the disk o may be made of metal and have the letters or signs for marking cut out in them like a stencil, or the disk o might be of transparent material as glass or mica and have the letters or signs printed upon it in black.

In order that the negatives taken in one holder may not be confounded or mixed up with those taken in another holder, I give each holder a number and I cut that number through the sash k as indicated at 1 in the lower left hand corner of Fig. 1. This number will be printed upon the negative at the same time as the exposure is made to take a picture.

What I claim as my invention is—

1. The combination with a photographic roll holder, of a movable plate having upon it a series of consecutive numbers or signs to be presented successively to the light through an opening in the holder for producing photographically simultaneously with the taking of the pictures on the film in the holder, a successive series of marks upon several pictures so taken, substantially as herein set forth.

2. The combination with a photographic roll holder, of one or more rotary photographic printing dials geared with and driven by one of the rollers of the holder for marking photographically with consecutive numbers the successive impressions on the film, substantially as herein set forth.

3. The combination with a photographic roll holder, of a printing dial facing to the front of said holder and a registering dial facing to one side of the said holder, the said dials being both geared with one of the rollers of the said holder and being arranged respectively opposite openings in the front and in one side of the holder to present corresponding numbers or signs opposite the said openings, substantially as and for the purpose herein set forth.

In witness whereof I have hereunto set my hand in the presence of two subscribing witnesses.

HERMANN MACKENSTEIN.

Witnesses:
 ROBT. M. HOOPER,
 CHARLES ASSI.